United States Patent Office 3,065,791
Patented Nov. 27, 1962

3,065,791
PROCESS FOR DRILLING WELLS WITH A GAS
William G. Bearden, Clarence R. Fast, and George C. Howard, Tulsa, Okla., assignors to Pan American Petroleum Corporation, Tulsa, Okla., a corporation of Delaware
No Drawing. Filed Jan. 16, 1959, Ser. No. 787,109
3 Claims. (Cl. 166—21)

This invention relates to well drilling operations in which a gas is circulated in the well to remove bit cuttings. More particularly, it relates to solving the difficulties which occur during such drilling operations when the well penetrates a water-producing formation.

When a well is being drill with a gas as a circulated fluid and water enters the well, the water tends to trap the bit cuttings preventing their being blown out of the well by the circulated gas. The bit cuttings become dispersed by hydration and mechanical action to form a viscous mud in the bottom of the well or "ball-up" and stick together and completely prevent removal of cuttings from the hole. This can cause abandonment of the gas as the circulating fluid and adoption of a liquid circulating agent. The result is a slower drilling rate characteristic of using a liquid as the circulating fluid.

Several solutions have been proposed for this problem. Foaming agents can be used to remove limited amounts of water. When more than about 100 barrels per hour of water enters the well, however, the advantages of drilling with gas are generally offset by the high cost of the foaming agent. In addition, the amount of water which can be handled is limited by the amount and pressure of gas available. A means for decreasing the entry of water into the well is obviously desirable.

Several means for decreasing water entry have been proposed. These include injecting a settable material, for example a plastic or polymer such as urethane. At least two such materials are available commercially. Another proposal is to inject an aluminum sulfate solution followed by ammonia gas. Still another involves injecting alcohol solutions of water-insoluble materials such as rosin. Upon dilution of the alcohol by water, some of the rosin precipitates in the water producing formation to decrease the permeability.

All these methods have one principal difficulty in common. They involve the use of chemicals which are usually quite expensive. One of the treating solutions, for example, cost about $5 per gallon. Due mostly to the expensive nature of the treating solutions, it is usually desirable to isolate a limited portion of the well for treatment. This requires extra equipment, and more importantly, requires time and extra well manipulation. Any time-consuming operation tends to defeat the principal advantage of gas drilling which is saving of drilling time. The same objection is particularly applicable to the use of polymers which require several hours for the polymerization reaction to proceed to a satisfactory degree.

Another problem which arises in use of expensive treating solutions is that only small volumes are economically feasible. This means that they can be injected to only a short distance from the well bore. Since the plugging action in no case is complete, deeper penetrating treatments are desirable. Still another problem is the interference of treating chemicals with continued drilling operations. Few, if any, of the treating agents will provide a complete water shutoff. Therefore, foaming agents will usually be required in further drilling operations. Water shutoff agents may be incompatible with the foaming agents used in the drilling operations.

With the above problems in mind, it is an object of our invention to provide a process for decreasing the amount of water entering a well being drilled with a gas as the circulated fluid. A more particular object is to provide such a process in which the treating material is inexpensive and can be applied to the entire open hole section in an amount sufficient to penetrate the formations to a considerable depth. An additional object is to provide a treating agent which will not interfere with the use of foaming agents used in continued drilling operations.

We have found that the objects of our invention can be accomplished by injecting into the formation an oil which is free from additives. Water-producing formations are water-wet. Oil injected into such formations has little contact with formation surfaces. If the oil is present in high concentrations, the oil will be connected together throughout the pores. At somewhat lower concentrations, the oil exists in the pore spaces of the formation as isolated droplets. When water attempts to flow through a formation containing such oil droplets, the flowing water tends to carry the oil droplets into restricted portions of the pores where the oil droplets decrease the rate of flow of water. By injecting a volume of oil into the water-producing formation, an oil block is established in the formation which is surprisingly effective. This oil block can decrease the permeability of the formation to flow of water by a factor of more than 10. The oil should be a mineral oil, preferably crude petroleum or a fraction thereof.

Additives to the oil are not required. This has two advantages. First, the cost of the treating material is greatly decreased. This makes possible the use of very large volumes of the treating liquid. Second, many additives tend to decrease the size of the oil droplets to an extent permitting them to flow back out of the formation. In addition, many surface active additives decrease the interfacial tension between oil and water. This also increases the ability of the oil droplets to flow back into the well. The use of additive-free oil avoids this second disadvantage.

We have found that oil having a viscosity of only one or two centipoises can establish an oil block in the water-producing formation. Oils having higher viscosities of 20 to 30 centipoises, and sometimes of even several hundred centipoises, establish more complete oil blocks in the formation. Therefore, the more viscous oils should be used if possible.

One precaution must be observed in the use of viscous oils to establish oil blocks in water-producing formations encountered in gas drilling operations. These viscous oils must be injected slowly into the formations to avoid fracturing the formations. Frequently, the pressures required for fracturing formations in a given area are well known. In this case, the pessure imposed on the oil should be closely regulated so as not to exceed this known fracturing pressure. In other cases, it will be advisable to impose upon the formation a pressure of no more than about 0.5 pound per square inch per foot of well depth. Few, if any, formations can be fractured by such pressures.

We have also found that an additional plugging action can be obtained by injecting a batch of water into the formations after the oil. It is presumed that this water tends to decrease the concentration of oil in the formation to such a dgree that the oil becomes discontinuous. That is, it becomes separated into isolated droplets. When this action takes place, there is less tendency for the oil to flow back into the well rather than establishing an oil block in the formation. This not only avoids loss of the oil, but also avoids any danger of explosive mixtures when air is used as the circulated gas. The injected water has the additional advantage of displacing some of the oil ahead of it and thus extending the treatment to a greater distance from the well. The volume of water should be at least about 10 percent of the volume of oil and preferably should be about 20 to about 50 percent of this volume. Even larger volumes may be used, of course, if desired.

The volume of oil injected into the formation can be 10 to 20 times as great as the volume of presently available treating solutions. Present solutions are ordinarily used in amounts ranging from 10 to 20 or 30 gallons per foot of well depth being treated. Since the cost of the oil is only $\frac{1}{10}$ to $\frac{1}{100}$ of that of presently available solutions, we can afford to use from 100 to 200 or 300 gallons per foot of depth even though the treatment is applied to a length of well as much as 10 times that ordinarily treated. A much more effective block is, of course, established by this large volume treatment.

In actual field operations, natural gas and air are the two gaseous circulating fluids ordinarily employed. If natural gas is the circulating fluid, any oil remaining in the well from the treatment may be simply gas lifted up the drill pipe by injecting natural gas into the annular space between the drill pipe and the well wall. If air is employed as the circulating fluid, however, it may be advisable to displace the oil from the well by circulating water before injecting air into the well, or the oil may be purged from the well with an inert gas such as nitrogen. This avoids the possibility of establishing explosive mixtures in the well. Since many wells are drilled into gas or oil-producing formations while using air as a circulating fluid, however, this problem of forming an explosive mixture is not believed to be serious.

When applying our method to the treatment of a well, the circulation of the gas is stopped. Oil is then introduced into the well by any convenient means. It may be permitted to run down inside the drill pipe or may be introduced into the well bore outside the drill pipe. A pressure is then applied to the well sufficient to cause the oil to be displaced back into the water-producing formations. As previously noted, the pressure should be carefully controlled to avoid fracturing the formation. The pressure may be applied to the oil by use of any suitable pump, or if sufficient gas pressure is available, this pressure may be applied to the top of the oil to force the oil into the formation being treated. If water is to be injected after the oil, as much of the oil as possible should be displaced into the formation before the water is introduced into the well. This avoids the possibility that the water will fall through the oil and be injected first. It is also possible to introduce the water into the drill pipe and allow it to displace any residual oil up outside the drill pipe. Pressure can then be applied both inside and outside the drill pipe to force the water into the formation.

Due to the limited gas pressure ordinarily available at a well, it will usually be impossible to displace all liquid from the well into the formation. Some liquid will, therefore, remain in the well. If the amount of liquid is small, the liquid may be removed simply by resuming circulation of gas. This is particularly true if the liquid is water and if one of the highly effective foaming agents available for lifting water is used. It is also usually possible to remove oil or water from the well by a reverse circulation operation. In this method the gas is injected into the well outside the drill pipe. It enters the drill pipe through the ports of the bit and gas lifts the liquid up the drill pipe thus removing the liquid from the well. If a considerable depth of liquid remains in the well, it is sometimes necessary to lift the bit up the well until it is submerged to only a shallow depth in the liquid. After this liquid is removed, the bit is lowered a short distance and the gas lifting operation is repeated. These operations are continued until the bit reaches the bottom of the well and substantially all the liquids are removed from the well. Normal circulation of gas and drilling operations can then be resumed.

Our invention will be better understood by consideration of the following example conducted in the laboratory. Cores about 9 centimeters in diameter and about 70 centimeters long were cut from outcrop samples of Berea sandstone. These were mounted in rubber sleeves to the outside of which pressure was applied to seal the sleeves to the cores. The cores were saturated with brine containing about 50,000 p.p.m. of sodium chloride, after which, the permeability to flow of the brine was determined for each core. Oil was then injected into one of the cores. In two tests the oil was displaced into the cores by water injected into the same end as the oil. In all cases, after the injections into one end, brine was injected into the other end to simulate the action which would take place when injection pressure was released and drilling operations were resumed. Flow of brine was maintained until stabilized conditions were noted. The permeability was then observed and the degree of plugging was determined. Results of four tests are presented in the following table.

|  | Test No. 1 | Test No. 2 | Test No. 3 | Test No. 4 |
|---|---|---|---|---|
| Description of Core: |  |  |  |  |
| Formation | Berea | Berea | Berea | Berea |
| Length, cm | 70.3 | 70.3 | 70.5 | 69.7 |
| Diameter, cm | 9.04 | 9.04 | 9.2 | 9.2 |
| Pore Volume, cc | 900 | 900 | 890 | 881 |
| Initial Permeability, md | 95 | 74.3 | 90.6 | 49 |
| Fluids Injected: |  |  |  |  |
| First Stage | [1]27 | [1]27 | [1]220 | [1]1.5 |
| Volume, cc | 959 | 300 | 264 | 264 |
| Pressure, p.s.i. | 275 | 200 | 730 | 300 |
| Second Stage | [1]1.5 | water |  | water |
| Volume, cc | 9,000 | 105 |  | 100 |
| Pressure, p.s.i. | 100 | 185 |  | 300 |
| Backflow Data: |  |  |  |  |
| Backflow pressure, p.s.i. | 262 | 200 | 250 | 180 |
| Volume Backflowed, cc | 2,700 | 2,340 | 2,670 | 2,643 |
| Permeability of Overall core, md | 13.2 | 6.25 | 8.65 | 8.35 |
| Assumed length of invaded zone, cm.[2] | 70.3 | 31.6 | 20.9 | 28.8 |
| Permeability of assumed invaded zone, md | 13.2 | 2.95 | 2.75 | 3.83 |
| Permeability Reduction, percent | 86.1 | 96.0 | 97.0 | 92.2 |

[1] Oil cp.
[2] Length of core times volume injected divided by the pore volume of the core.

In test number 1, an effort was made to set up an extreme condition. This condition was a high concentration of a low viscosity oil in the core. To obtain a more effective displacement of water from the core, and oil with an intermediate viscosity of 27 centipoises was first used. This oil was then displaced by a large volume of the low viscosity oil. Due to the large amount of oil in the core, continuous flow paths should have been available for flow of the oil out of the core when brine was injected into the opposite end of the core. Upon backflow of brine through this core, it was found that the permeability had been reduced by 86.1 percent. Considering the high concentration of oil in the core and the low viscosity of the oil, this reduction of permeability to only about $\frac{1}{7}$ of the original value was considered to be very good. These results demonstate the effectiveness of the method even when an oil having a low viscosity is used and is not displaced into the formation by water.

In test number 4 the same low viscosity oil (1.5 cp.) was used as in the second stage injection in test number 1. In test number 4, however, the oil was displaced into the core by a small batch of water. The permeability was reduced to less than $\frac{1}{12}$ the original value. Comparison of the result with that reported in test number 1 shows that the use of a small amount of water following the oil injected into the formation can produce a further decrease in permeability to a value of only about half that obtained by use of oil alone.

Tests number 2 and 3 show the effects of using oils having viscosities of 27 and 220 centipoises respectively. These tests seem to indicate that the higher the viscosity the more effective the oil block. Again, it should be noted, however, that the use of very viscous oils so greatly increases the danger of fracturing the use of such oils may not be advisable. Test number 2 also shows the effective blocking action obtainable by use of a small batch of water to displace the oil into the formation.

It will be apparent that we have provided a process which is effective to accomplish the objects of our invention. Obviously, a very large decrease in permeability of water producing formations is produced. The treating agent is simply oil, for example crude petroleum. This is about as inexpensive a treating agent as could be used. Therefore, very large volumes can be employed economically to treat long sections of the well. Further improvement can be obtained by use of a little water, again a very low-cost material. All the treating materials are free from additives which might complicate further drilling operations. The process is very simple and requires only equipment which is ordinarily available. The usual drilling crew can carry out all steps of the operation. Therefore, the process can be performed quickly with a minimum loss of time, the principal item saved by use of gas rather than liquid as a drilling fluid.

We claim:
1. In the process of drilling wells in which a gas is circulated in the well to remove the bit cuttings, and in which water free from oil entering the well from a water-producing formation complicates drilling operations, the improvement comprising stopping circulation of the gas, introducing additive-free oil into the well, said oil having a viscosity of at least about 1 centipoise and the amount of said oil being at least about 10 gallons per linear foot of the treated section of well, applying to the oil a pressure sufficient to cause the oil to enter said water-producing formation, but insufficient to fracture said formation, displacing the oil into the formation with a volume of water under a pressure insufficient to fracture said formation, and resuming drilling operations including the circulation of gas.

2. In the process of drilling wells in which a gas is circulated in the well to remove the bit cuttings, and in which water free from oil, entering the well from a water-producing formation complicates drilling operations, the improvement comprising stopping circulation of the gas, introducing additive-free oil into the well, said oil having a viscosity of at least about 1 centipoise and the amount of said oil being at least about 10 gallons per linear foot of the treated section of well, applying to the oil a pressure sufficient to cause the oil to enter said water-producing formation, but insufficient to fracture said formation, displacing the oil into the formation with a volume of water under a pressure insufficient to fracture said formation, removing excess liquids from the well, resuming circulation of gas in the well, and resuming drilling operations.

3. In the process of drilling wells in which a gas is circulated in the well to remove the bit cuttings, and in which water free from oil entering the well from a water-producing formation complicates drilling operations, the improvement comprising stopping circulation of the gas, introducing additive-free oil into the well, said oil having a viscosity of at least about 1 centipoise and the amount of said oil being at least about 10 gallons per linear foot of the treated section of well, applying to the oil a pressure sufficient to cause the oil to enter said water-producing formation, displacing the oil into the formation with a volume of water, both the oil and water being forced into the formation at a pressure insufficient to establish in the well a bottom-hole pressure in pounds per square inch of more than about 0.5 times the depth of the well in feet, and resuming drilling operations including the circulation of gas.

References Cited in the file of this patent
UNITED STATES PATENTS

| | | |
|---|---|---|
| 2,377,529 | Stephenson | June 5, 1945 |
| 2,387,361 | Stephenson | Oct. 23, 1945 |
| 2,747,839 | Moore | May 29, 1956 |
| 2,784,787 | Matthews et al. | Mar. 12, 1957 |
| 2,818,231 | Freeman et al. | Dec. 31, 1957 |
| 2,865,453 | Widmer | Dec. 23, 1958 |
| 2,886,108 | Piety | May 12, 1959 |
| 2,994,378 | Reistle | Aug. 1, 1961 |